United States Patent
Schmidt et al.

(10) Patent No.: US 10,658,952 B2
(45) Date of Patent: May 19, 2020

(54) DRIVE SYSTEM

(71) Applicant: SEW-EURODRIVE GMBH & CO. KG, Bruchsal (DE)

(72) Inventors: Josef Schmidt, Graben-Neudorf (DE); Michael Geissler, Kronau (DE); Maja Sliskovic, Ettlingen (DE); Dieter Groß, Waghäusel (DE); Jürgen Böckle, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 284 days.

(21) Appl. No.: 15/033,414

(22) PCT Filed: Oct. 20, 2014

(86) PCT No.: PCT/EP2014/002821
§ 371 (c)(1),
(2) Date: Apr. 29, 2016

(87) PCT Pub. No.: WO2015/062708
PCT Pub. Date: May 7, 2015

(65) Prior Publication Data
US 2016/0254764 A1 Sep. 1, 2016

(30) Foreign Application Priority Data
Oct. 31, 2013 (DE) .......... 10 2013 018 271

(51) Int. Cl.
*H02P 3/04* (2006.01)
*H04B 3/54* (2006.01)
(Continued)

(52) U.S. Cl.
CPC ............... *H02P 3/04* (2013.01); *H02K 5/225* (2013.01); *H02P 27/08* (2013.01); *H02P 27/16* (2013.01);
(Continued)

(58) Field of Classification Search
CPC ............ Y02T 10/7005; Y02T 10/7077; Y02T 10/6217; H01L 2924/00; B60L 11/123
See application file for complete search history.

(56) References Cited

U.S. PATENT DOCUMENTS

| 6,890,041 B1* | 5/2005 | Ribbens | ................ B64C 25/46 303/112 |
| 2002/0039010 A1* | 4/2002 | Plasz | ..................... G05B 19/40 318/567 |
| 2012/0009066 A1* | 1/2012 | Vilbrandt | ............. F03D 7/0224 416/153 |

FOREIGN PATENT DOCUMENTS

| DE | 100 14 183 | 10/2001 |
| DE | 10014183 | * 10/2004 |

(Continued)

OTHER PUBLICATIONS

Translation of DE10014183 has been attached.*
(Continued)

*Primary Examiner* — Elvin G Enad
*Assistant Examiner* — Zoheb S Imtiaz
(74) *Attorney, Agent, or Firm* — Hunton Andrews Kurth LLP

(57) ABSTRACT

A drive system includes a power converter and a motor powered from the power converter via supply leads. An electromagnetically actuatable brake is disposed on the motor. The brake is able to be supplied and is therefore controllable from an AC/DC converter, which is powered via lines from a DC/AC converter that is powered and/or controlled by signal electronics of the power converter.

8 Claims, 3 Drawing Sheets

(51) Int. Cl.
  *H02P 27/16* (2006.01)
  *H02P 29/60* (2016.01)
  *H02K 5/22* (2006.01)
  *H02P 27/08* (2006.01)

(52) U.S. Cl.
  CPC ............ *H02P 29/60* (2016.02); *H04B 3/542* (2013.01); *H04B 2203/5458* (2013.01); *H04B 2203/5466* (2013.01)

(56) References Cited

FOREIGN PATENT DOCUMENTS

| DE | 102011109537 | * | 2/2007 |
| DE | 102011100361 | * | 11/2008 |
| DE | 10 2009 013 311 | | 9/2010 |
| DE | 10 2011 100 361 | | 11/2012 |
| DE | 10 2011 109 537 | | 2/2013 |
| WO | 2013020625 A1 | | 2/2013 |

OTHER PUBLICATIONS

Translation of DE102011109537 has been attached.*
Translation of DE102011100361 has been attached.*
International Preliminary Report on Patentability issued in PCT/EP2014/002821, dated May 19, 2016.
International Search Report, dated Aug. 7, 2015, issued in corresponding International Application No. PCT/EP2014/002821.

* cited by examiner

Drive System

FIELD OF THE INVENTION

The present invention relates to a drive system.

BACKGROUND INFORMATION

It is generally known that a drive system has a converter-fed electric motor.

SUMMARY

Example embodiments of the present invention provide a device and a method that may ensure a reliable and trouble-free brake supply.

Among features of example embodiments of the present invention with regard to the drive system are that it has a power converter and a motor powered from the power converter via supply leads. An electromagnetically actuatable brake is disposed on the motor. The brake is able to be supplied and is therefore controllable from an AC/DC converter, which is powered via lines from a DC/AC converter that is powered and or controlled by signal electronics of the power converter.

An advantage in this context is that the brake is able to be controlled largely independently of the system voltage. The reason is that even in the event of voltage fluctuations on the network side, with the aid of the DC/AC converter, an AC voltage is able to be generated that is usable for controlling the brake. For example, a low voltage with a frequency between 10 kHz and 1000 kHz is used as AC voltage.

The lines and the supply leads may be disposed in one common cable.

For example, the lines are twisted together.

The signal electronics of the power converter may include a data-coupling device by which signals are able to be modulated upon the lines or demodulated.

The AC/DC converter may have a data-coupling device by which signals are able to be modulated upon the lines or demodulated, the data-coupling device of the AC/DC converter being connected to signal electronics that are integrated on the motor, e.g., are integrated in the terminal box of the motor. This is considered advantageous because not only is the brake able to be supplied, but also the brake-control information is able to be transmitted with the aid of the lines.

An STO (safe torque off) detector may be connected to the signal electronics integrated in the motor.

The STO detector may monitor the voltage curves present on at least two of the three or on the three supply leads on the motor side, so that in the event of a line break and/or fault in the power converter, the brake is able to be applied. An advantage is that upon loss of the rotating magnetic field generated by the power converter, the STO detector detects this loss and controls the brake such that it is applied.

A rotor-angle sensor and/or a sensor device, e.g., including temperature sensor, structure-borne noise sensor and/or torque sensor, is/are disposed with the signal electronics integrated on the motor. An advantage is that the sensor signals are evaluable by signal electronics, which are integrated in the motor. In this context, the brake is able to be controlled with the aid of these signal electronics as a function of the sensor signals. The sensor signals may be able to be transmitted to the power converter.

Further features and aspects of example embodiments of the present invention are described in more detail below with reference to the appended Figures.

DETAILED DESCRIPTION

Figure 1:
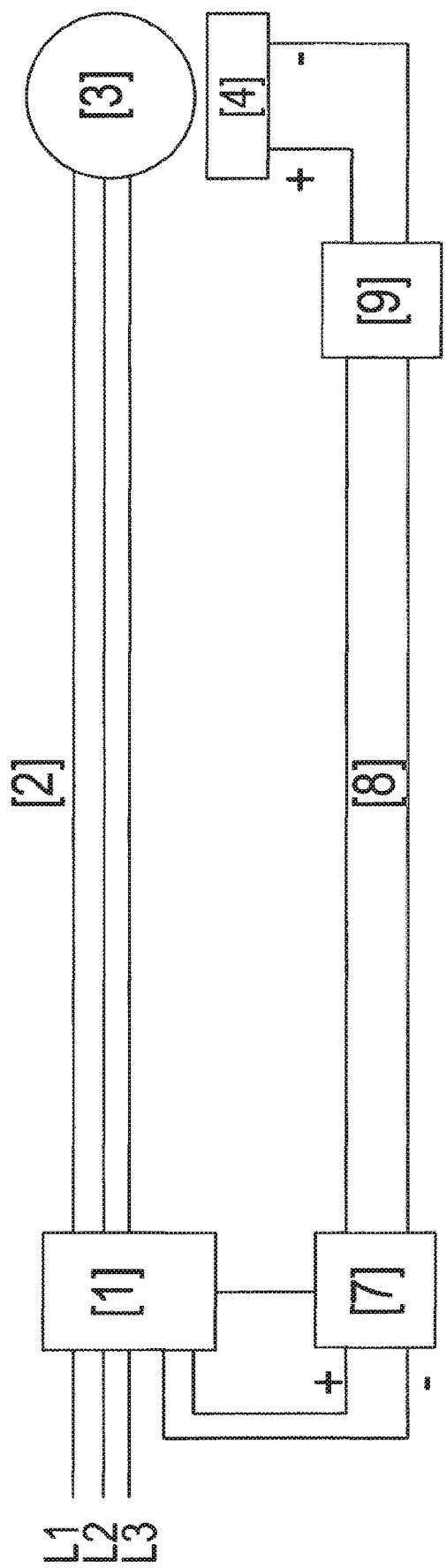
In FIG. 1, a drive system according to an example embodiment of the present invention is illustrated schematically, having an electric motor 3 without an angle-sensing system.

As shown in FIG. 1, electric motor 3 is fed from a power converter 1, especially from a voltage-commutated frequency converter, via a cable 2 having supply leads.

The supply leads are implemented as three-phase current lines, so that on the output side, power converter 1 makes a three-phase voltage available, which powers motor 3.

The power converter is supplied from network phases (L1, L2, L3), the system voltage being rectified, and an inverter being supplied from the unipolar voltage thus generated. The inverter has three half-bridges made up of power semiconductor switches, driven in pulse-width modulated fashion, for generating the output-side three-phase voltage system powering the motor.

Disposed on motor 3 is an electromagnetically actuatable brake 4 by which the rotor shaft of motor 3 is able to be braked. To that end, brake 4 has a coil, upon whose energizing, an armature disk is drawn toward the coil against the spring force generated by a spring element, and the brake is thus released.

When the coil is not energized, the armature disk is pressed by the spring element onto an axially displaceable brake-pad carrier that is joined in rotatably fixed fashion to the rotor shaft and is pressed onto a braking surface.

During energizing, the coil of brake 4 is fed from the DC-side output of an AC/DC converter 9, e.g., a rectifier, whose input-side AC voltage is made available via lines 8, e.g., twisted lines, from a DC/AC converter 7.

For example, this DC/AC converter 7 is integrated in power converter 1, e.g., is disposed in the housing of the power converter and is powered from a DC voltage generated by the power converter.

DC/AC converter 7 is implemented as an infeed unit controlled by power converter 1, so that brake 4 is controllable by the infeed unit. The brake is released or applied as a function of the AC voltage thus present or not present at the output of DC/AC converter 7.

For example, lines 8 are integrated in cable 2. In this context, lines 8 are implemented as low-voltage lines, and the supply leads are implemented as medium-voltage lines.

Figure 2:
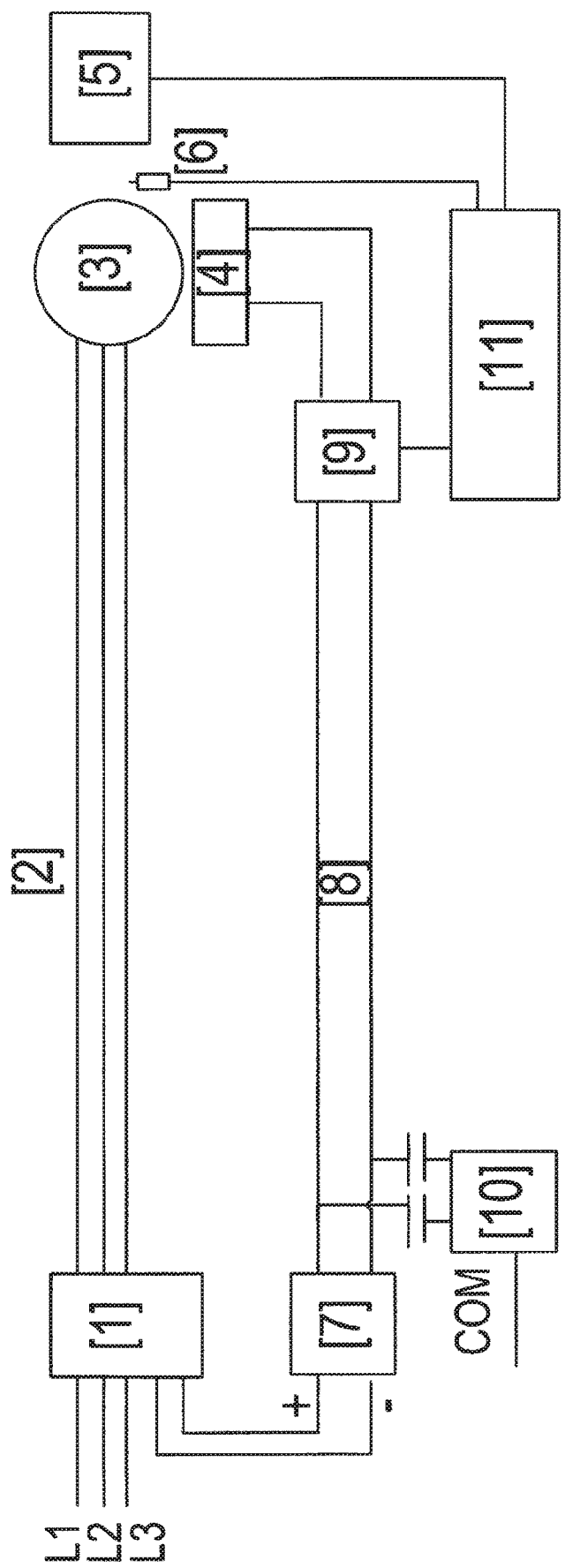
In FIG. 2, a drive system according to an example embodiment of the present invention is illustrated schematically, in which in contrast to FIG. 1, a rotor-angle sensor 5 is disposed on electric motor 3.

As shown in FIG. 2, also disposed on motor 3 is a rotor-angle sensor 5, by which the angular position of the rotor shaft of motor 3 is detectable. In addition, a further sensor device 6, e.g., including a temperature sensor, structure-borne noise sensor and/or torque sensor, is disposed on the motor, so that values of one or more corresponding physical variables are also detectable. Further sensor device 6 and rotor-angle sensor 5 are connected to signal electronics 11, which are fed from AC/DC converter 9. Signal electronics 11 transmit data via lines 8, by capacitively coupling the data onto lines 8 in the AC/DC converter, so that a corresponding coupling device is thus integrated in the AC/DC converter. On the power converter side, the data are decoupled by data-coupling device 10 and conducted via a communication interface COM.

The brake-control signal, likewise coupled by data-coupling device 10 onto lines 8, is transmitted to AC/DC converter 9, which makes the supply voltage available for the coil of brake 4 as a function of the brake-control signal.

The data transmitted via communication interface COM to power converter 1 is taken into account and/or further processed by the signal electronics of power converter 1.

Figure 3:
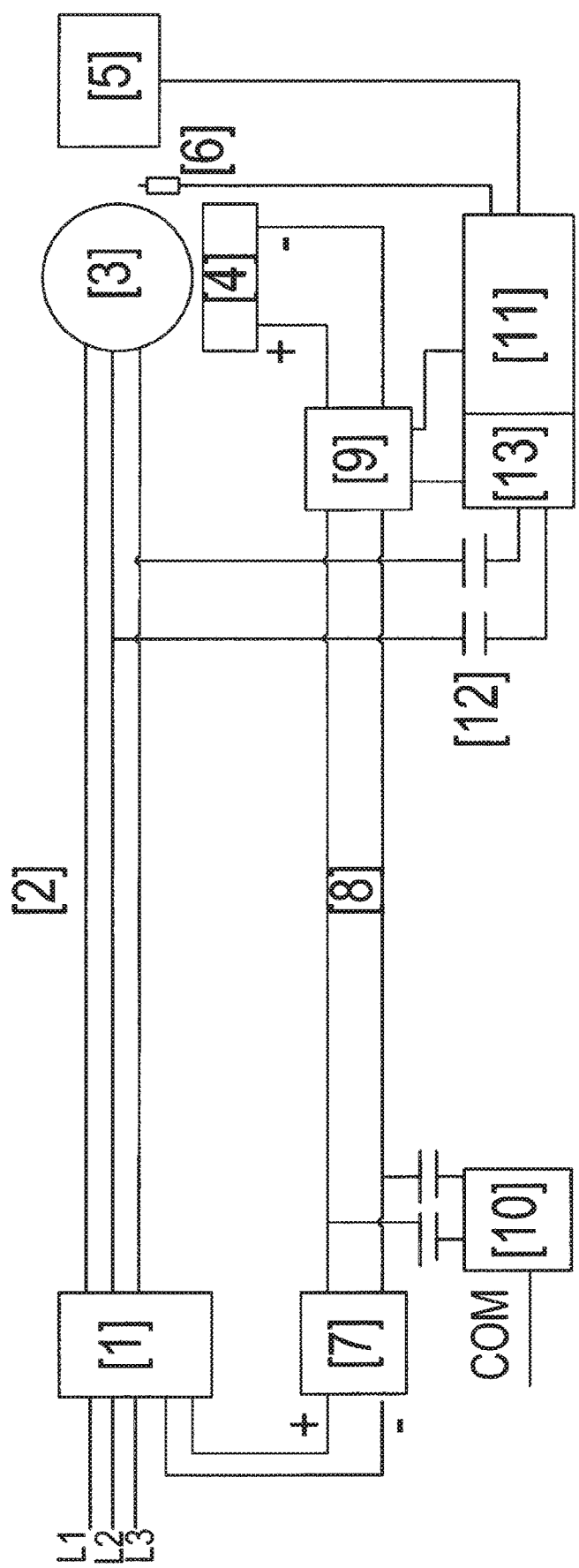
In FIG. 3, a drive system according to an example embodiment of the present invention is illustrated schematically, in which in contrast to FIG. 2, an STO detector is provided.

As shown in FIG. 3, in addition, an STO detector 13 is provided which monitors the three-phase voltage present on the supply leads of cable 2. In this context, either only two of the phase voltages of the three-phase voltage system are monitored, as shown in FIG. 3, or alternatively, all three phase voltages of the three-phase voltage system are monitored. The phase voltages are detected capacitively, thus, are transmitted to the STO detector with the aid of a coupling device 12. Consequently, in the case of constant voltage or vanishing voltage on the respective phase, no voltage is detectable by STO detector 13.

Therefore, if an STO signal, e.g., a safe torque off signal, is implemented at power converter 1, this is detectable by STO detector 13, and the supply voltage of brake 4 is reliably switched off by switching off the AC/DC converter accordingly. Reliability is increased owing to the evaluation of the pulse pattern with the aid of STO detector 13 directly on motor 3, since power converter 1 and the motor cable are monitored during normal operation as well, and therefore in response to a line break or fault condition in power converter 1, brake 4 is driven by STO detector 13 via the AC/DC converter such that brake 4 is applied.

The motor voltage, e.g., the voltage of the power converter generated on the output side, is detectable by STO detector 13 during normal operation, as well.

Safety function STO thus relates to a reliable switch-off of the torque.

LIST OF REFERENCE CHARACTER

1 Power converter, especially voltage-commutated frequency converter
2 Cable, including supply leads
3 Electric motor
4 Electromagnetically actuatable brake
5 Rotor-angle sensor
6 Sensor device, e.g., including temperature sensor, structure-borne noise sensor and/or torque sensor
7 DC/AC converter
8 Lines, e.g., twisted lines
9 AC/DC converter, e.g., rectifier
10 Data-coupling device
11 Signal electronics
12 Coupling device
13 STO detector
L1 Network phase
L2 Network phase
L3 Network phase

What is claimed is:

1. A drive system, comprising:
a power converter;
a motor powered from the power converter via supply leads;
an electromagnetically actuatable brake disposed on the motor;
an AC/DC converter adapted to supply and control the brake; and
a DC/AC converter powered and/or controlled by signal electronics of the power converter, the DC/AC converter adapted to power the AC/DC converter via lines connected between the DC/AC converter and the AC/DC converter.

2. The system according to claim 1, wherein the lines and the supply leads are disposed in a common cable.

3. The system according to claim 2, wherein the lines and supply leads are twisted together.

4. The system according to claim 1, wherein the signal electronics of the power converter include a data-coupling device adapted to modulate and/or demodulate signals upon the lines, the AC/DC converter having a data-coupling devices adapted to modulate and/or demodulate signal upon the lines, the data-coupling device of the AC/DC converter being connected to signal electronics that are integrated on the motor.

5. The system according to claim 4, wherein the signal electronics are integrated in a terminal box of the motor.

6. The system according to claim 1, further comprising an STO (safe torque off) detector connected to the signal electronics integrated in the motor, the STO detector adapted to monitor voltage curves present (a) on at least two of three or (b) on three supply leads on a motor side, so that in the event of a line break and/or fault in the power converter, the brake is able to be applied.

7. The system according to claim 1, further comprising a rotor-angle sensor and/or a sensor device disposed with the signal electronics integrated on the motor.

8. The system according to claim 7, wherein the sensor device includes a temperature sensor, structure-borne noise sensor, and/or torque sensor.

* * * * *